United States Patent
Sun

(10) Patent No.: US 8,702,390 B2
(45) Date of Patent: Apr. 22, 2014

(54) AUTOMATIC BLADE PITCH ANGLE CONTROL MECHANISM FOR SMALL HORIZONTAL AXIS WIND TURBINES

(75) Inventor: Ming-Tsung Sun, Taipei (TW)

(73) Assignee: Chang Gung University, Taoyuan County (TW)

( * ) Notice: Subject to any disclaimer, the term of this patent is extended or adjusted under 35 U.S.C. 154(b) by 719 days.

(21) Appl. No.: 12/952,565

(22) Filed: Nov. 23, 2010

(65) Prior Publication Data

US 2012/0128491 A1    May 24, 2012

(51) Int. Cl.
*F03D 1/02* (2006.01)
*F03D 7/04* (2006.01)

(52) U.S. Cl.
USPC .................. 416/41; 416/44; 416/89; 416/117

(58) Field of Classification Search
USPC ............. 416/40, 41, 44, 87, 88, 89, 117, 119, 416/131, 135, 136, 137
See application file for complete search history.

(56) References Cited

U.S. PATENT DOCUMENTS

| 2,505,969 | A | * | 5/1950 | Jacobs | 416/136 |
| 4,316,698 | A | * | 2/1982 | Bertoia | 416/11 |
| 4,909,703 | A | * | 3/1990 | Jacobs | 416/89 |
| 2012/0128491 | A1 | * | 5/2012 | Sun | 416/140 |

* cited by examiner

*Primary Examiner* — Edward Look
*Assistant Examiner* — Christopher R Legendre

(57) ABSTRACT

A wind turbine includes a hub including at least three spaced projections and a hub cap; at least three blades each including a root plate at one end, with the root plate including a sleeve having a hole on a windward side; at least three shaft members each interconnecting the root plate and a corresponding projection; at least three sets of four abutment plates each secured to either side of the root plate or either side of the projection; U-shaped steel torsion bars each having both ends at an inclined angle of about 15 to 25 degrees fastened in the abutment plate and disposing the root plate at an angle of about 4 to 10 degrees with respect to the corresponding projection; a spring on the rotation shaft on a leeward side of the hub; and pins each installed in a hub cap and sticking into the hole.

2 Claims, 4 Drawing Sheets

AUTOMATIC BLADE PITCH ANGLE CONTROL MECHANISM FOR SMALL HORIZONTAL AXIS WIND TURBINES

BACKGROUND OF THE INVENTION

1. Field of Invention

The invention relates to wind turbines and, more particularly, to a small horizontal axis wind turbine having an automatic blade pitch angle control mechanism including lateral torsion bars fastening a hub and each blade together so that a rotational torque, as a result of blade rotation, can change blade pitch angle automatically, with the wind turbine being adapted to activate under low speed wind, to have a high $C_P$ (power coefficient) under high speed wind, and to protect the blades under strong gusts.

2. Description of Related Art

A typical small wind turbine has blades secured directly to a hub (i.e., fixed pitch blades). It is desired that the wind turbine can be activated under low speed wind and have a large $C_P$ under high speed wind. The two goals are difficult to achieve at the same time for wind turbines with fixed pitch blades.

Another type of typical wind turbine has blades capable of being temporarily deformed in response to wind speed to increase efficiency of harnessing the wind power. However, its fabrication is very complicated and costly due to technological difficulties. Furthermore, the strength of such blades can be greatly weakened by the repeating deformations. Consequently, their lifetime is shortened significantly.

As for the protection of the blades in strong winds, the side-furling mechanism is mostly used. The mechanism turns the wind turbine away from the strong wind and returns it back to the calming wind. The advantage of the mechanism is its simplicity in principle. Its disadvantages are twofold: 1. Even though the turbine outputs power when it slightly furls, the power reduces greatly due to the highly sensitive nature of horizontal axis wind turbines to the yaw angle; and 2. In response to strong gusts, returning from furling takes time and consequently reduces the overall efficiency. Thus, the need for improvement still exists.

SUMMARY OF THE INVENTION

It is therefore one object of the invention to provide a wind turbine comprising a hub comprising at least three equally spaced projections and a hub cap; at least three blades each comprising a root plate at one end, with the root plate including a sleeve having a hole on a windward side; at least three shaft members each for interconnecting the root plate and a corresponding one of the projections; at least three sets of four abutment plates, with each abutment plate being secured to either side of the root plate or either side of the projection; a plurality of U-shaped torsion bars formed of steel, with each torsion bar having both ends at an inclined angle of about 15 to 25 degrees and fastened in the abutment plate and disposing the root plate at an angle of about 4 to 10 degrees with respect to the corresponding projection; a spring put on the rotation shaft on the leeward side of the hub; and a plurality of pins each installed in a hub cap and sticking into the hole in the sleeve. The blades rotate about the rotation shaft responsive to wind. The blade pivots clockwise or counterclockwise about the shaft member for changing a blade pitch angle responsive to the angular velocity of the blades. The pins clear the holes when the wind speed is greater than a predetermined speed to axially move the hub, with the blade pitch angles of the blades being changed further. The changes persist until the blades stall and stop accelerating angularly for decreasing the force exerted upon the blades.

The above and other objects, features and advantages of the invention will become apparent from the following detailed description taken with the accompanying drawings.

DETAILED DESCRIPTION OF THE INVENTION

Figure 1:
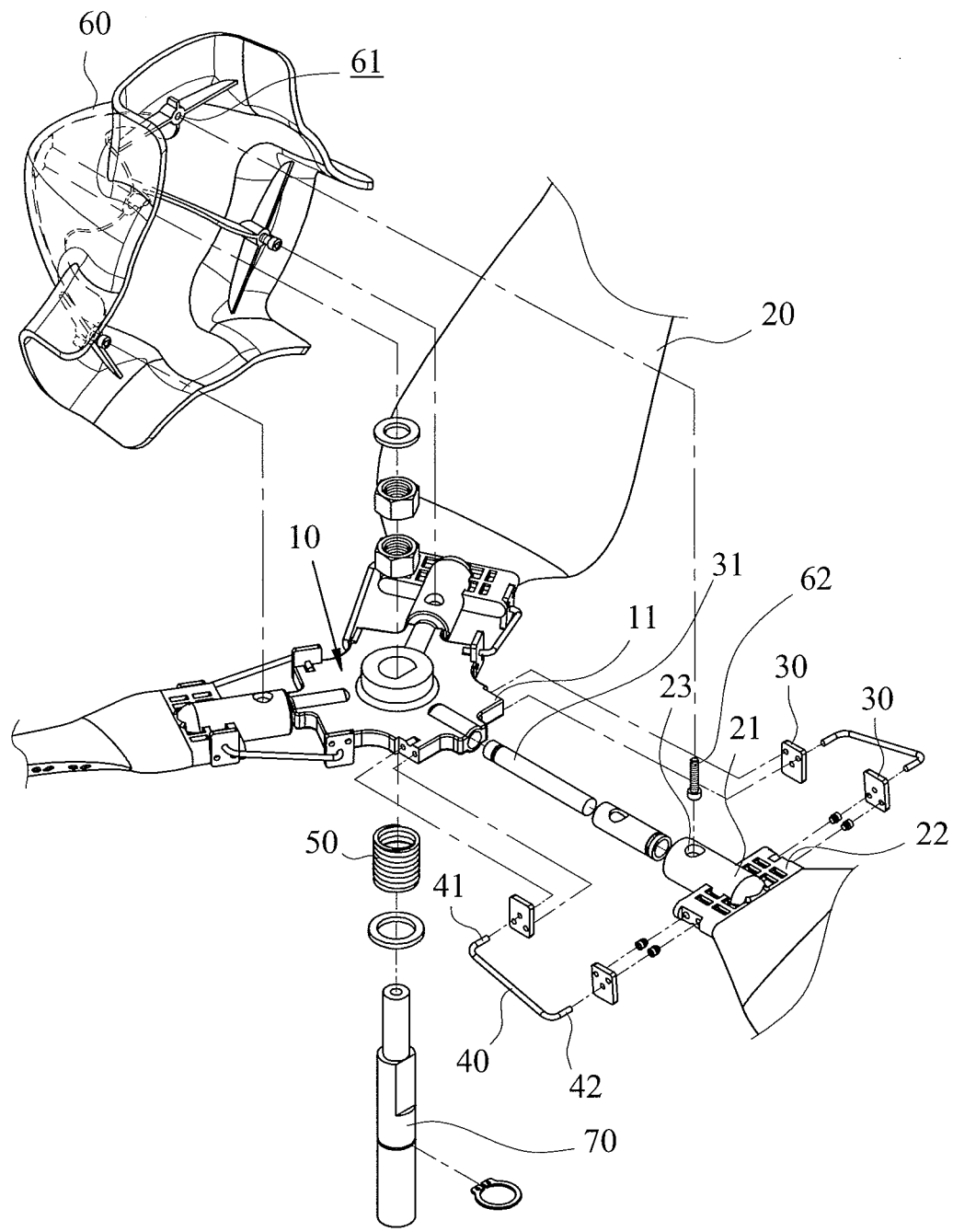
FIG. 1 is an exploded perspective view of hub and its adjacent portions of a small horizontal axis wind turbine according to the invention.
Figure 2:
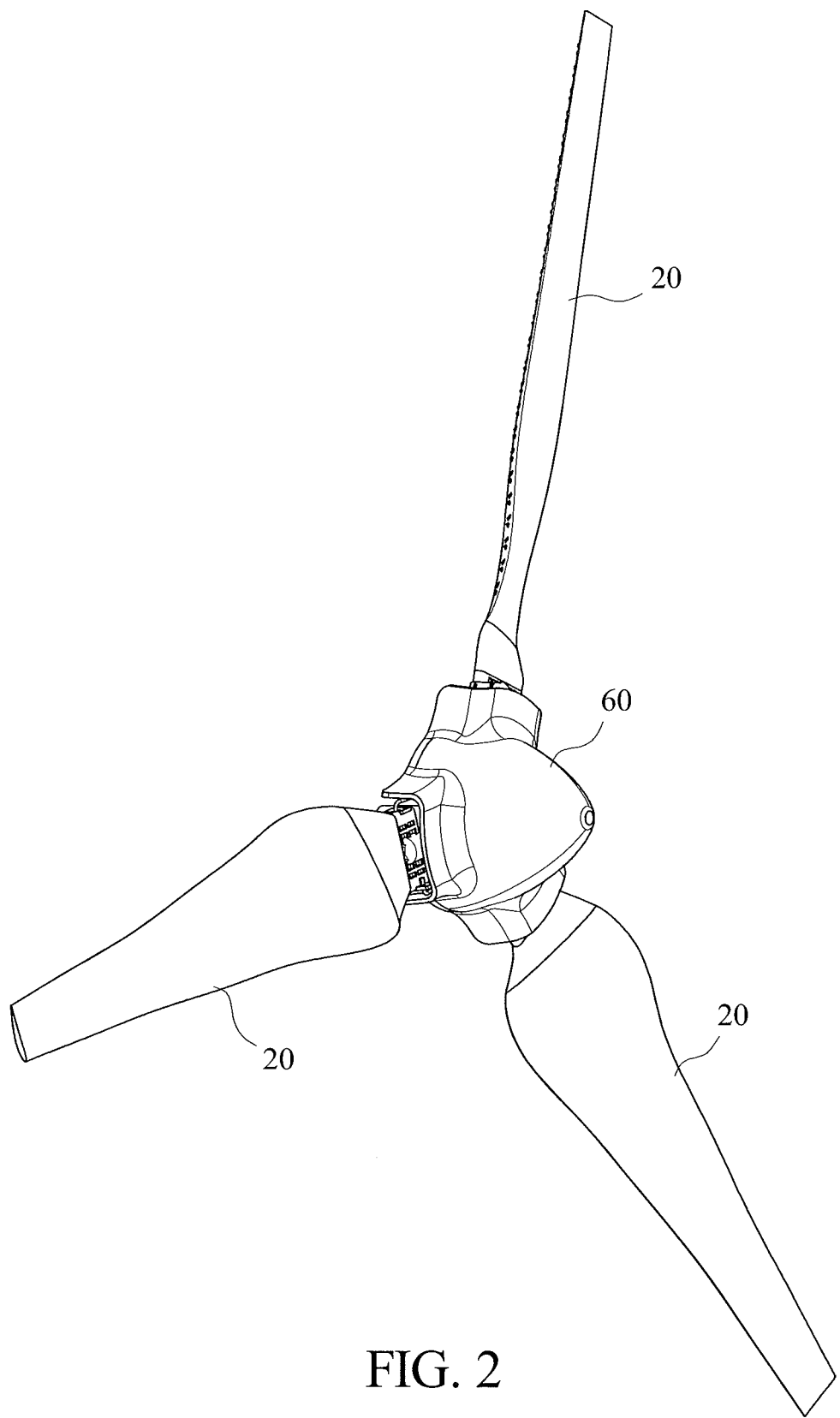
FIG. 2 is a perspective view of the assembled wind turbine.
Figure 3:
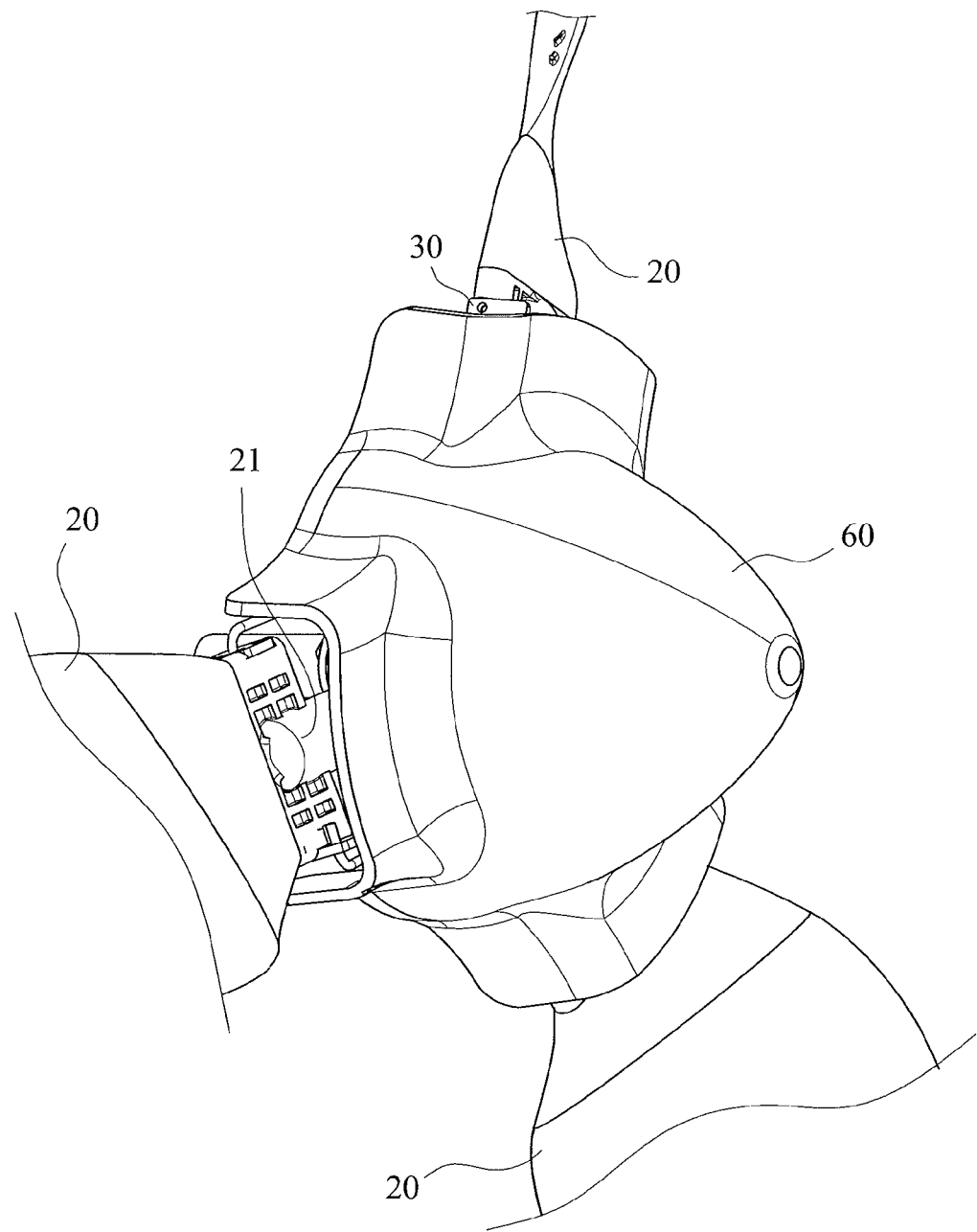
FIG. 3 is an enlarged view of the hub cap and its adjacent portions of FIG. 2.
Figure 4:
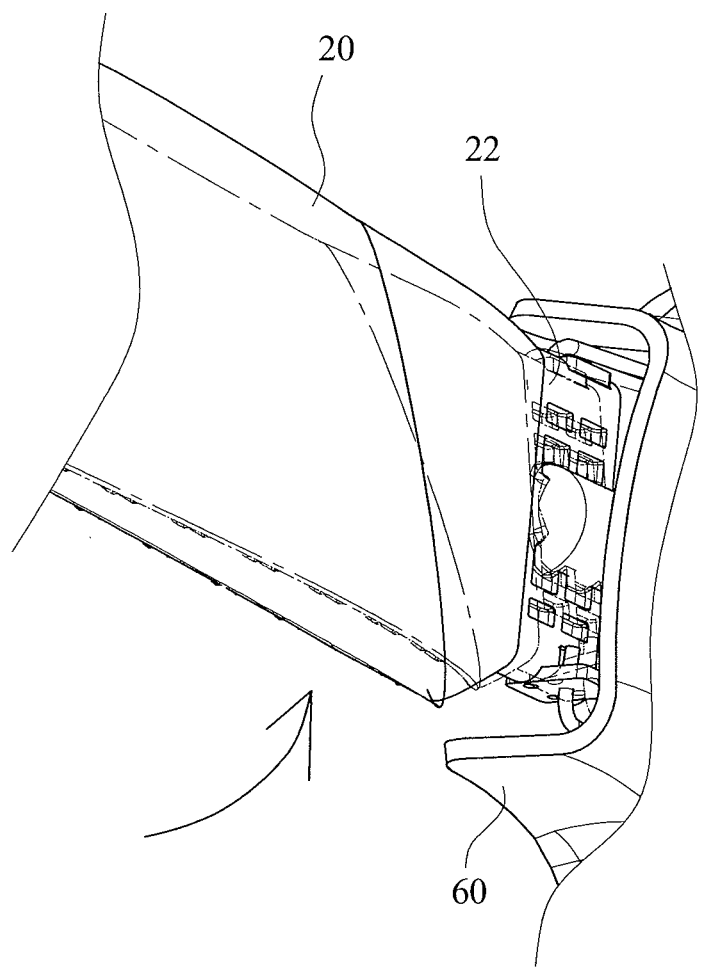
FIG. 4 is a fragmentary view of FIG. 3 showing a change of the blade pitch angle in response to wind speed.

Referring to FIGS. 1 to 4, a small horizontal axis wind turbine in accordance with the invention comprises the following components as discussed in detail below.

A hub 10 comprises a plurality of (e.g., three) equally spaced projections 11.

Each of a plurality of (e.g., three) blades 20 has one end (e.g., root plate 22) attached to the projection 11 by a shaft member 31.

A plurality of (e.g., three) sets of a plurality of (e.g., four) rectangular abutment plates 30 is provided. The abutment plate 30 is secured to 1) either side of the root plate 22 of the blade 20 or 2) either side of the projection 11.

Alternatively, the abutment plate 30 is secured to 1) either side of the root plate 22 of the blade 20 or 2) either side of the projection 11 by integrally forming therewith.

Each of a plurality of U-shaped torsion bars 40 has its bent ends 41, 42 at an inclined angle in the range of about 15 to 25 degrees and is inserted into the abutment plate 30 for fastening. Both of the ends 41, 42 of the torsion bar 40 are forged to prevent it from coming off the abutment plate 30. The root plate 22 of the blade 20 is at an angle in the range of about 4 to 10 degrees with respect to the projection 11. Thus, the blade 20 may rotate about an axial axis (i.e., rotation shaft 70) of the hub 10 responsive to wind. Further, the blade 20 may pivot clockwise or counterclockwise privet about the shaft member 31 responsive to the angular velocity of the blade 20 due to the centrifugal force of the blade 20 and the constraint of the torsion bars 40 (i.e., blade pitch angle being changed). As a result, the wind turbine can be activated under low speed wind and has a large $C_P$ (power coefficient) under high speed wind.

A precompressed spring 50 is put on the rotation shaft 70 on which the hub 10 is free to move axially but rotates with the rotation shaft 70. Each of a plurality of pins 62 is installed in a pin seat 61 of a hub cap 60 and sticks into a hole 23 with a larger diameter than that of the pin 62 on the windward side of a sleeve 21, such that the variation of the pitch angle of the blade 20 is limited to an upper limit for a high $C_P$. The pins 62 may clear the holes 23 when the wind speed is greater than a predetermined speed and the wind pressure is so great to compress the precompressed spring 50 to axially move the hub 10. As such, the pitch angles of the blades 20 may be changed. As the pitch angle changes to a preset maximum value, the blades 20 stall and stop accelerating angularly. This can decrease wind force exerted upon the blades 20 for safety and protection purposes.

The characteristics and advantages of the invention are as follows. The root plates 22 of the blade 20 and the hub 10 are fastened together by the abutment plates 30. Further, the torsion bars 40 are mounted to the abutment plates 30 in an inclined angle. The blade 20 and the hub 10 are spaced apart by the shaft member 31. The lateral torsion bars 40 are provided for holding the blades 20 in place. The blades 20 may rotate responsive to wind. In turn, a centrifugal force is generated and exerted upon the blades 20. The root plate 22 of the blade 20 is at an angle with respect to the hub 10. Thus, the centrifugal force may push the blades 20 away from the hub 10 due to the automatic blade pitch angle control mechanism. Moreover, the shaft member 31 is provided through the hub 10 and the root plate 22. Further, the lateral torsion bars 40 are provided to secure the blades 20 and the hub 10 together. As a result, a rotational torque is generated. The torque may decrease an angle of the hub 10 with respect to the blade 20 due to the provision of the torsion bars 40. The decrease is dynamic in response to the angular velocity. As a result, an automatic change of blade 20 pitch angle is made.

Each of the pins 62 is installed in the pin seat 61 of the hub cap 60 and sticks into the hole 23 with a larger diameter than that of the pin 62 on the windward side of a sleeve 21. As such, the variation of the pitch angle of the blade 20 is limited to an upper limit for a high $C_P$. The pins 62 may clear the holes 23 when the wind speed is greater than a predetermined speed and the wind pressure is so great to compress the precompressed spring 50 to axially move the hub 10. Accordingly, the pitch angles of the blades 20 may be changed. As the pitch angle changes to a preset maximum value, the blades 20 stall and stop accelerating angularly. This can decrease wind force exerted upon the blades 20 for safety and protection purposes.

The automatic blade pitch angle control mechanism is constructed between the hub 10 and each of the blades 20. The pitch angle of each of the blades 20 may be changed in response to the rotation speed of the hub 10 (i.e., wind speed). The wind turbine thus can be activated when wind speed is low and further has an increased $C_P$ when wind speed is high (e.g., gusts).

While the invention has been described in terms of preferred embodiments, those skilled in the art will recognize that the invention can be practiced with modifications within the spirit and scope of the appended claims.

What is claimed is:
1. A wind turbine comprising:
    a rotation shaft;
    a hub comprising at least three equally spaced projections and a hub cap, with the hub rotating with the rotation shaft and axially moveable on the rotation shaft;
    at least three blades each comprising a root plate at one end, with the root plate including a sleeve having a hole on a windward side;
    at least three shaft members each for interconnecting a corresponding root plate and a corresponding one of the projections;
    at least three sets of four abutment plates, with each of the abutment plates secured to either side of the corresponding root plate or either side of the corresponding one of the projections;
    a plurality of U-shaped torsion bars formed of steel, with each of the torsion bars having both ends at an inclined angle of about 15 to 25 degrees and fastened in corresponding abutment plates and disposing the corresponding root plate at an angle of about 4 to 10 degrees with respect to the corresponding one of the projections;
    a spring on the rotation shaft on a leeward side of the hub; and
    a plurality of pins each installed in the hub cap and each receivable into the hole in a corresponding sleeve,
    wherein the at least three blades rotate about the rotation shaft responsive to wind;
    wherein each blade pivots clockwise or counterclockwise about a corresponding one of the at least three shaft members for changing a blade pitch angle responsive to the angular velocity of the at least three blades;
    wherein the blade pitch angle is limited by the plurality of pins received in the holes of the sleeves of the root plates of the at least three blades; and
    wherein the plurality of pins clear the holes when a wind speed greater than a predetermined speed axially moves the hub on the rotation shaft, with the blade pitch angles of the at least three blades changed further.
2. The wind turbine of claim 1, wherein the both ends of the torsion bar are formed by forging, and the both ends of the torsion bar are inserted into the corresponding abutment plates.

* * * * *